United States Patent Office 3,324,053
Patented June 6, 1967

3,324,053
FOAMED EPOXY RESIN COMPOSITIONS
Charles H. Braithwaite, Jr., Whittier, Calif., assignor to United States Borax & Chemical Corporation, Los Angeles, Calif., a corporation of Nevada
No Drawing. Filed Sept. 30, 1963, Ser. No. 312,344
15 Claims. (Cl. 260—2.5)

The present invention relates to novel foamed epoxy resin compositions and method for producing same.

This application is a continuation-in-part of my copending application Ser. No. 178,540, filed Mar. 9, 1962 and now abandoned.

It is the principal object of the present invention to provide new and useful foamed epoxy resin compositions.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises foamed epoxy resin compositions comprising the reaction product of at least one epoxidized polyolefin resin, a hydrocarbon blowing agent and a curing agent, said curing agent selected from the group consisting of trinaphthyl borate, triphenyl borate and substituted triphenyl borates, said substituents selected from the group consisting of alkyl radicals of from 1 to 20 carbon atoms and halogen radicals.

The present foamed epoxy resin compositions can be obtained as both rigid and flexible foams. These foamed compositions have superior electrical properties, adhesive properties, toughness and resiliency, and they exhibit excellent temperature resistance and moisture resistance.

The present compositions have numerous industrial applications and their utility is further enhanced by the fact that they can be applied as foam-in-place systems or as prefoamed molded materials in a variety of shapes and forms. These compositions have utility as light-weight encapsulation materials for electrical components, as shock absorbent materials for the packaging industry, and they can be used in the manufacture of many consumer products. The foams are also useful as sound insulating materials in the construction and aircraft industries, and find overall industrial utility as thermal insulation.

From the foregoing broadly stated paragraph it will be seen that the present foamed compositions comprise a specific class of epoxy resins, a specific class of borate curing agents, and a blowing agent.

The epoxy resins applicable to the present invention are the oxidation products of polyolefins and are structurally distinguished from the epoxy resins based upon epichlorohydrin-bisphenol condensates. They are known to those skilled in the art as epoxidized polyolefins or peracid derived epoxy resins since they are derived from the oxidation of unsaturates with an organic peracid such as peracetic acid, performic acid, perbenzoic acid, etc. The unsaturates include cyclopolyolefins such as dicyclopentadiene and vinylcyclohexene, aliphatic polyolefins such as polybutadiene and polyisoprene, unsaturated glycerides such as tall oil, soybean oil, linseed oil and a wide variety of other fats and oils, fatty acids and esters and alcohols. As stated above, the epoxidized polyolefins are a well-known family of epoxy resins and reference may be had to the following patents which describe these resins and their methods of manufacture: U.S. Patents 2,804,473, 2,810,-732, 2,826,556, 2,829,130, 2,829,131, 2,829,135, 2,833,747, 2,919,283, 2,935,517, 2,991,293, and British Patents 877,-136 and 877,137. The various epoxidized polyolefin resins may be used alone or in combination. Thus, the present foamed products may be made from an epoxidized aliphatic polyolefin or an epoxidized cyclopolyolefin or a combination of such epoxidized polyolefins.

The specific class of borates which are the curing agents are the triaryl borates of the formula $B(OR)_3$, where R is either phenyl, naphthyl, alkyl-substituted phenyl, in which the alkyl substituents are of from 1 to 20 carbon atoms, or halogen-substituted phenyl. The following list is illustrative of applicable triaryl borates:

Triphenyl borate
Tri-β-naphthyl borate
Tri-2,4-diethylphenyl borate
Tri-o-cresyl borate
Tri-p-cresyl borate
Tri-m-cresyl borate
Tri-o-chlorophenyl borate
Tri-2-methyl-5-ethylphenyl borate
Tri-m,p-cresyl borate
Tri-2,4-dimethylphenylborate
Tri-3,4-dimethylphenyl borate
Tri-octylphenyl borate
Tri-nonylphenyl borate
Tris(p-dodecylphenyl)borate
Tris(pentadecylphenyl)borate
Tris(eiscosaphenyl)borate As stated previously, the alkyl substituents on the phenyl can contain from 1 to 20 carbon atoms and it will be noted that these alkyl substituents can be straight or branched chains. It is to be noted further that any one or any combination of the defined triaryl borate esters can be used as the curing agent. In the preferred embodiment of the invention I use tri-m,p-cresyl borate which is an isomeric mixture of cresyl borates prepared from commercially available m,p-cresol.

The blowing agents applicable to the present compositions are the hydrocarbons and halogenated hydrocarbons which have a boiling point of from about 25° C. to about 50° C. and which are inert to the present resins and curing agents. The following list is illustrative of the materials applicable as blowing agents in the present invention:

Pentanes
Hexanes
Diethyl ether
Dichlorodifluoromethane
Dichloromonofluoromethane
Monochlorodifluoromethane
Trichloromonofluoromethane The chlorofluorocarbons are preferred in the present invention since they have an extremely low heat transfer and they give a high K factor to the finished foamed composition.

When the present curing agents are added to the epoxidized polyolefin resins an exothermic polymerization reaction takes place which activates the blowing agent. The heat of the exothermic reaction causes the blowing agent to volatilize and to attempt to escape from the resin, while at the same time the resin undergoes crosslinking which results in the blowing agent being locked in small bubbles in the resin. The resultant foamed product is thus a mass of closed cells containing the blowing agent.

For many purposes the exothermic reaction caused by the addition of the curing agent is too rapid and it is necessary to slow down the exotherm of reaction. This can be accomplished in the present instance by any one of several methods. I have found that the alkylene glycol boric anhydrides and/or the alkylene glycol biborates when added to the present compositions act to slow down the exothermic reaction and can be used to control the heat of reaction to substantially any desired rate.

The alkylene glycol boric anhydrides and the alkylene glycol biborates applicable to the present invention have the following respective formulae:

$$R \diagup\!\!\!\!\!\diagdown_{O}^{O}\!\! B\text{—}O\text{—}B \diagup\!\!\!\!\!\diagdown_{O}^{O}\!\! R$$

$$R \diagup\!\!\!\!\!\diagdown_{O}^{O}\!\! B\text{—}O\text{—}R\text{—}O\text{—}B \diagup\!\!\!\!\!\diagdown_{O}^{O}\!\! R$$

where R is an alkylene radical of from 2 to 4 carbon atoms in length and containing a total of from 2 to 20 carbon atoms. Any one or any combination of these compounds can be used as the "cooling agent" in the present compositions.

The following list is illustrative of the above described glycol boric anhydrides and glycol biborates:

Di(2,3-propanediol)boric anhydride
Di(1,2-ethanediol)boric anhydride
Di(2-methyl-2,4-pentanediol)boric anhydride
Di(2,3,4-trimethyl-2,4-pentanediol)boric anhydride
Di(1,4-butanediol)boric anhydride
Di(2,2-dimethyl-1,3-butanediol)boric anhydride
Di(2-methyl-1,2-butanediol)boric anhydride
Tri(2-methyl-2,4-pentanediol)biborate
Tri(1,3-propanediol)biborate
Tri(2-ethyl-1,3-hexanediol)biborate
Tri(1,2-ethanediol)biborate
Tri(2-methyl-2-ethyl-1,3-propanediol)biborate
Tri(2,3-butanediol)biborate When using the foregoing alkylene glycol borates to control the heat of reaction, I prefer an admixture consisting of from about 15 to about 95 percent by weight of the triaryl borate esters and from about 5 to about 85 percent by weight of the glycol boric anhydrides and/or the glycol biborates.

Another method for slowing down the rapid exothermic reaction is by using a curing agent or combination of curing agents having long chain alkyl substituents. For example, tris(pentadecyl)borate has a much more prolonged rate of cure than triphenyl borate. Still another way of obtaining a longer rate of cure is to use an epoxidized polyolefin resin having a lesser number of oxirane groups per monomer unit. For example, polybutadiene has a large number of available double bonds, any one of which can be selectively epoxidized. I have found that by decreasing the number of epoxy groups per monomer unit, in polybutadiene for instance, two effects can be accomplished: first, the gel time and the exotherm will be affected in the desired directions, and second, the flexibility of the molecule will be increased.

Thus, if desired, it is possible to control the rate of cure of an epoxidized polyolefin by the use of a "cooling agent" such as the previously defined glycol borates, or to use a curing agent having long chain substituents, or to use an oxirane "starved" polyepoxy resin.

The preparation of the present foamed epoxy resin compositions is performed by mixing the epoxidized polyolefin resin with a blowing agent to obtain a homogeneous mixture. The curing agent is then added and an exothermic reaction takes place. As noted previously, the heat generated by the reaction causes the blowing agent to volatilize and the reaction mass foams and finally sets to the desired foamed resin composition.

The amount of each ingredient used, epoxy resin, blowing agent and curing agent, is somewhat dependent on the specific physical properties desired. In the preferred embodiment of the invention, from about 40 to about 70 percent by weight of epoxidized polyolefin resin, from about 10 to about 45 percent by weight of blowing agent, and from about 10 to about 30 percent by weight of curing agent are used to prepare the present foamed epoxy resin compositions.

It is also to be noted that other ingredients such as silicone oils and fireproofing agents can be added to the reaction mass prior to the addition of the curing agent to provide other desirable properties to the finished product. A particularly useful fireproofing agent is antimony oxide. It has been found that when about 25 to about 100 parts of antimony oxide are added to 100 parts of the epoxy resin prior to the addition of the curing agent, a self-extinguishing foam is formed. Other inorganic materials can also be added, such as alumina, which is a useful filler.

So that the present invention can be more clearly understood, the following examples are given for illustrative purposes:

(I) To 30 grams of OXIRON 2000 epoxy resin was added 19.0 grams of trichloromonofluoromethane. OXIRON 2000 is a product of FMC Corp., described as an epoxidized polyolefin having the structure:

$$\left[ -CH_2-CH-CH-CH_2-CH_2-CH\diagdown_{O}\!\!\!\diagup CH-CH_2-CH_2-CH=CH-CH_2-CH_2-CH-CH-CH- \atop \quad\quad\quad\;\; OH\;\; \underset{\underset{CH_3}{C=O}}{O} \quad\quad\quad\quad\quad\quad\quad\quad\quad\quad\quad\quad\quad\quad\quad\quad\quad\quad\quad\quad\quad\quad\quad\quad\quad\quad\quad\quad\quad\quad\quad\;\; \underset{\underset{CH_2}{\overset{CH}{|}}}{CH}\;\; \underset{\underset{CH_2}{\overset{CH_2}{\|}}}{CH_2} \right]_x$$

The ingredients were thoroughly admixed and 4 grams of triphenyl borate were added with constant agitation. The heat of reaction developed rapidly and the reaction mass was transferred to a mold. The mass was then allowed to foam in place and a rigid uniform foamed resin was recovered from the mold.

(II) Example I was repeated except that an equivalent amount of pentane was used as the blowing agent. The results were substantially the same as noted in Example I.

(III) To 29.1 grams of OXIRON 2000, an epoxidized aliphatic polyolefin resin was added 19.0 grams of trichloromonofluoromethane, and the ingredients were thoroughly agitated to yield a homogeneous mixture. Two grams of tri-m-,p-cresyl borate and 8 grams of di(2-methyl-2,4-pentanediol)boric anhydride were added to the mixture with constant agitation, and when heat began to evolve the entire reaction mass was transferred to a mold. The reaction mass was then allowed to foam in place and a rigid uniformly foamed epoxy resin composition was recovered from the mold.

(IV) An admixture of 27.6 grams of OXIRON 2000, an epoxidized aliphatic polyolefin resin and 14.2 grams of an epoxidized glyceride resin, EPOXOL 7-4 (a product of Swift & Co., described as an epoxidized soybean oil), was added to 20.0 grams of trichloromonofluoromethane, with constant agitation. To this admixture 5.0 grams of tri-β-naphthyl borate was added with constant agitation, and when heat began to evolve, the entire reaction mass was transferred to a mold. The reaction mass was then allowed to foam in place and a flexible uniformly foamed epoxy resin composition was recovered from the mold.

(V) To 25.9 grams of 3,4-epoxy-6-methylcyclohexylmethyl-3,4-epoxy-6-methylcyclohexanecarboxylate, an epoxidized cyclopolyolefin resin, was added 10.8 grams of trichloromonofluoromethane, and the ingredients were thoroughly agitated to yield a homogeneous mixture. To this mixture 7.7 grams of tri-m,p-cresyl borate and 1.0 gram of di(2-methyl-2,4-pentanediol)boric anhydride were added with constant agitation, and when heat began to evolve the entire reaction mass was transferred to a mold. The reaction mass was then allowed to foam in place and a rigid uniformly foamed epoxy resin composition was recovered from the mold.

(VI) To 20.4 grams of OXIRON 2000, an epoxidized aliphatic polyolefin resin and 11.9 grams of 3,4-epoxy-6-methylcyclohexylmethyl - 3,4 - epoxy - 6 - methylcyclohexanecarboxylate, an epoxidized cyclopolyolefin resin, was added 20 grams of diethyl ether, and the ingredients were thoroughly agitated to yield a homogeneous mixture. To this admixture 4.4 grams of tri-m,p-cresyl borate and 13.2 grams of tri(2-methyl-2,4-pentanediol)biborate were added with constant agitation, and when heat began to evolve the entire reaction mass was transferred to a mold. The reaction mass was then allowed to foam in place and a rigid uniformly foamed epoxy resin composition was recovered from the mold.

(VII) To 31.3 grams of EPOXOL 7-4 (a product of Swift & Co., described as an epoxidized soybean oil), was added 14.2 grams of dichlorotetrafluoroethane, and the ingredients were thoroughly agitated to yield a homogeneous mixture. To this admixture 3.14 grams of tri-p-cresyl borate, 6.28 grams of tri(1,3-butanediol)biborate and 6.28 grams of di(2-methyl-2,4-pentanediol)boric anhydride were added with constant agitation, and when heat began to evolve the entire reaction mass was transferred to a mold. The reaction mass was then allowed to foam in place and a flexible uniformly foamed epoxy resin composition was recovered from the mold.

(VIII) To 31.3 grams of an epoxidized soybean oil was added 14.2 grams of dichlorotetrafluoroethane with thorough agitation. To this admixture 15 grams of tris(pentadecylphenyl)borate was added with constant agitation, and when heat began to evolve the entire reaction mass was transferred to a mold. The reaction mass was then allowed to foam in place and a flexible uniformly foamed epoxy resin was recovered from the mold.

(IX) To 123.8 grams of 3,4-epoxy-6-methylcyclohexylmethyl-3,4-epoxy-6-methylcyclohexanecarboxylate, an epoxidized cyclopolyolefin resin, were added 35.2 parts per hundred of resin of monofluorotrichloromethane, 3.4 parts per hundred of resin of a silicone-glycol copolymer, and 48.7 grams of a mixture comprising 95% tri-m,p-cresylborate and 5% tri(2-methyl-2,4-pentanediol)biborate. The ingredients were thoroughly agitated to yield a homogeneous mixture. When heat began to evolve and bubble formation had begun, the mass was then transferred to a mold and the reaction mass was allowed to foam in place. After foaming was complete, the foamed mass was transferred to an oven and was postcured at 100° C. for 2 hours. The resultant rigid foamed resin had a uniform bubble structure throughout the entire mass and had a density of 1.6 pounds per cubic foot.

A block was cut from the foamed mass, weighed and immersed in water for three days. After standing for three additional days at ambient temperature, the block was found to be unchanged in weight from its weight previous to water immersion. Its appearance and rigidity were also unaffected.

(X) To a mixture of 11.0 grams of 3,4-epoxy-6-methyl-cyclohexylmethyl - 3,4 - epoxy - 6 - methylcyclohexanecarboxylate, an epoxidized cyclopolyolefin resin, 4.0 grams of trichloromonofluoromethane and 0.23 gram of a silicone-glycol copolymer was added 3.2 grams of antimony oxide. The resultant mixture was thoroughly mixed and then 3.5 grams of tri-m,p-cresylborate was added. The ingredients were mixed together until heat began to evolve and bubbles were obtained. The mass was then transferred to a mold and the reaction mass was allowed to foam in place. A portion of the resulting foam was placed in a Bunsen Burner flame for 15 seconds or until a flame occurred and the foam then removed from the flame. The foam was self-extinguishing.

(XI) The procedure of Example X was repeated using 11.4 grams of the same epoxy resin, 4.1 grams of trichloromonofluoromethane, 0.24 gram of the silicone-glycol copolymer, 10.2 grams of antimony oxide, and 4.0 grams of tri-m,p-cresylborate. The resultant foam had a density of 1.8 and was self-extinguishing.

Any of the foamed resin compositions produced by the present invention can be postcured if desired. Postcuring results in a foamed resin having improved physical characteristics such as increased water resistance, increased tensile strength, increased impact strength, etc. For example, when the foamed resin of Example I was postcured at 100° C. for 2 hours, the resultant product was substantially impervious to water and had a markedly improved impact resistance.

It will be noted that in Example IX, a silicone glycol copolymer additive was used. This material is manufactured by the Dow-Corning and Union Carbide companies and its exact chemical composition is not available. However, these silicone-glycols are well known and widely used as a cell control and foam stabilizer for plastic foams generally. It will be clearly understood that the present invention is entirely independent of such additive and it can be used or not as desired by the operator. The silicone-glycol foam control agents can be used with any of the present epoxidized polyolefin resins and they are desirable since they help in causing the finished product to have a relatively uniform bubble structure throughout the entire mass.

Other modes of applying the principle of the invention may be employed, change being made as regards the details described, provided the features as stated in any of the following claims or the equivalent of such be employed.

I, therefore, particularly point out and distinctly claim as my invention:

1. A foamed epoxy resin composition comprising the reaction product of at least one epoxidized polyolefin resin, a hydrocarbon blowing agent, a curing agent selected from the group consisting of trinaphthyl borate, triphenyl borate and substituted triphenyl borate, said substituents selected from the group consisting of alkyl radicals of from 1 to 20 carbon atoms and halogen radicals, and at least one material selected from the group consisting of alkylene glycol boric anhydrides and alkylene glycol biborates in which said alkylene radicals are of from 2 to 4 carbon atoms in length and contain a total of from 2 to 20 carbon atoms.

2. A foamed resin composition according to claim 1, in which antimony oxide is included.

3. A foamed epoxy resin composition comprising the reaction product of at least one epoxidized polyolefin resin, a chlorofluorocarbon blowing agent, a curing agent selected from the group consisting of trinaphthyl borate, triphenyl borate and substituted triphenyl borate, said substituents selected from the group consisting of alkyl radicals of from 1 to 20 carbon atoms and halogen radicals, and at least one material selected from the group consisting of alkylene glycol boric anhydrides and alkylene glycol biborates in which said alkylene radicals are of from 2 to 4 carbon atoms in length and contain a total of from 2 to 20 carbon atoms.

4. A foamed cross-linked epoxy resin composition comprising the reaction product of an epoxidized aliphatic polyolefin resin, trichloromonofluoromethane, tri-m,p-cresyl borate and di(2 - methyl - 2,4 - pentanediol)boric anhydride.

5. A foamed cross-linked epoxy resin composition comprising the reaction product of an epoxidized cyclopolyolefin resin, trichloromonofluoromethane, and tris(pentadecylphenyl)borate.

6. A foamed cross-linked epoxy resin composition comprising the reaction product of an epoxidized aliphatic polyolefin resin, an epoxidized cyclopolyolefin resin, dichlorotetrafluoroethane, tri-m,p-cresyl borate and tri(2-methyl-2,4-pentanediol)biborate.

7. A foamed cross-linked epoxy resin composition comprising the reaction product of an epoxidized glyceride resin, dichlorotetrafluoroethane, triphenyl borate, tri(1,3-butanediol)biborate and di(2 - methyl - 2,4 - pentanediol) boric anhydride.

8. The method of producing a foamed epoxy resin composition which comprises admixing at about ambient temperature at least one epoxidized polyolefin resin, a hydrocarbon blowing agent having a boiling point of from about 25° C. to about 50° C. and a curing agent selected from the group consisting of trinaphthyl borate, triphenyl borate and substituted triphenyl borate, said substituents selected from the group consisting of alkyl radicals of from 1 to 20 carbon atoms and halogen radicals, and at least one material selected from the group consisting of the alkylene glycol boric anhydrides and the alkylene glycol biborates in which said alkylene radicals are of from 2 to 4 carbon atoms in length and contain a total of from 2 to 20 carbon atoms, and allowing the reaction mass to foam and set.

9. The method of claim 8 in which antimony oxide is included in said admixture.

10. The method of producing a foamed polyepoxy resin by admixing and allowing to react an epoxidized polyolefin resin, a hydrocarbon blowing agent having a boiling point of from about 25° to about 50° C., and a curing agent to give a cured foamed resin, wherein the improvement comprises employing as said curing agent a mixture of triaryl borate of the formula B(OR)$_3$ and at least one cooling agent selected from the group consisting of alkylene glycol boric anhydrides and alkylene glycol biborates in which said alkylene radicals are of from 2 to 4 carbon atoms in length and contain a total of from 2 to 20 carbon atoms and where R is selected from the group consisting of phenyl, naphthyl, alkyl-substituted phenyl in which the alkyl substituents have from 1 to 20 carbon atoms, and halogen-substituted phenyl, whereby a controlled rate of curing reaction is obtained.

11. The method according to claim 10 in which said triaryl borate is tri-m,p-cresyl borate.

12. The method according to claim 10 in which said cooling agent is tri(1,3-butanediol)biborate.

13. The method according to claim 10 in which said cooling agent is di(2 - methyl - 2,4 - pentanediol)boric anhydride.

14. The method according to claim 10 in which said curing agent comprises a mixture of about 15 to about 95 percent by weight of said triaryl borate and about 5 to about 85 percent by weight of said cooling agent.

15. The method according to claim 14 in which said triaryl borate is tri-m-p-cresyl borate.

References Cited

UNITED STATES PATENTS

| | | | |
|---|---|---|---|
| 2,953,545 | 9/1960 | Finestone | 260—47 |
| 3,025,249 | 3/1962 | Chen | 260—2.5 |
| 3,036,023 | 5/1962 | Rogers et al. | 260—2.5 |
| 3,051,665 | 2/1962 | Wismer et al. | 260—2.5 |
| 3,057,809 | 10/1962 | Newey | 260—2.5 |
| 3,154,504 | 10/1964 | Carey | 260—2.5 |

OTHER REFERENCES

Chemistry and Engineering News, vol. 36, No. 24, July 21, 1958, pp. 112 and 113.

MURRAY TILLMAN, *Primary Examiner.*

M. FOELAK, *Assistant Examiner.*